March 15, 1966     A. N. ORMOND     3,240,057

DUAL RANGE FORCE MEASURING INSTRUMENT

Filed Dec. 19, 1962

INVENTOR.
ALFRED N. ORMOND
BY *Elliott & Pastoriza*
ATTORNEYS

United States Patent Office 3,240,057
Patented Mar. 15, 1966

3,240,057
DUAL RANGE FORCE MEASURING INSTRUMENT
Alfred N. Ormond, 11969 Rivera Road,
Santa Fe Springs, Calif.
Filed Dec. 19, 1962, Ser. No. 245,881
2 Claims. (Cl. 73—141)

This application is a continuation-in-part of my co-pending application Serial No. 112,327, filed May 24, 1961, and entitled Dual Range Load Cells, now abandoned.

This invention relates generally to force measuring instruments and more particularly to an improved dual range force measuring instrument for providing two output signals of different sensitivities.

In my foregoing mentioned co-pending patent application, there is provided a dual range rhombic shaped load cell incorporating first and second transducer means in the form of strain gauges. These transducer means are positioned on one arm of the rhombic load cell in such a manner as to provide output signals having different slopes as a consequence of their physical positioning on the rhombic arm. Thus, one transducer was made primarily responsive to a bending moment and constituted a relatively sensitive output signal to provide a full scale reading from zero to a given fraction of full load. The other strain gauge, which was located in a different position, was primarily responsive to the strain in the arm itself or the force divided by the cross-sectional area, and provided a full scale reading from zero to full load.

The rhombic shaped load cell included stop means to limit bending type deformation so that after the stop means were engaged, no substantial further signal was provided by the first transducer means. However, the second transducer means responsive to the strain in the arm would continue to provide readings so that the desired dual range output was realized.

The foregoing structure as well as other structures heretofore visualized provide reasonably satisfactory results. However, there is still present a large interaction between the first and second transducer means. In other words, there may still result readings in the more sensitive output signal after the stop means have been engaged. Also, there will be a "knee" or discontinuity in the output signal curve for the higher load scale at the point where the stop means is engaged. Thus, the separate quantities to provide the signals of different slopes are inter-dependent to some extent and thus the desired dual range characteristics in which there is complete isolation is not ideally realized.

With the foregoing in mind, it is a primary object of this invention to provide an improved dual range force measuring instrument in which there is substantially complete isolation between the two output signals although both are derived from a single integral structure.

More particularly, it is an object to provide an improved dual range force measuring instrument in which a first sensitive range of reading is provided over a full scale for a given loading from zero up to a given fraction of full load and in which a second larger range of reading is provided over a full scale from a zero load to a full load to the end that a more versatile force measuring instrument is provided.

Briefly, these and many other objects and advantages of this invention are attained by providing a force measuring instrument incorporating first and second load cells associated with first and second transducers. In accordance with the invention, the first load cell is of a rhombic shape and the second load cell of a column type structure. One end of the column is secured to one vertex of the rhombic shape and the axis of the column is in axial alignment with a diagonal connecting the vertices of the rhombic shaped load cell in line with applied forces.

The rhombic shaped load cell itself includes stop means to limit its deformation when a given fraction of full load is applied between the one end of the column and the vertex of the rhombic shaped cell opposite said one vertex to which the column is connected.

With the foregoing arrangement wherein one of the load cells is of rhombic shape and the other a column type structure, the deformations to which the first and second transducers are respectively responsive are relatively independent so that the larger load range is substantially unaffected by the presence of the stop means.

A better understanding of the invention will be had by now referring to preferred embodiments thereof as illustrated in the accompanying drawings, in which.

Figure 1:
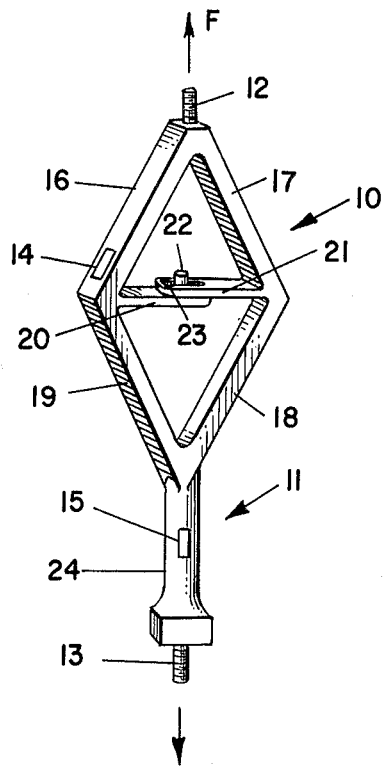
FIGURE 1 is a schematic perspective view of the improved dual range force measuring instrument of this invention showing a first type of stop means.

Referring first to FIGURE 1, the dual range force measuring instrument comprises a rhombic shaped load cell 10 and a column shaped load cell 11. As shown, the upper end of the column load cell 11 is integrally secured to the lower vertex of the rhombic shaped load cell 10. A load or force is applied to the upper vertex 12 diagonally in line with the axis of the column and the other end of the column 13 as indicated by the arrow F.

As shown, there are provided first and second transducing means in the form of strain gauges 14 and 15 respectively secured to the rhombic and column shaped load cells 10 and 11. These transducers will provide output signals of different slopes when plotted against progressive loading of the structure.

Referring now in detail to the rhombic shaped load cell 10, this load cell includes arms 16, 17, 18, and 19 connected end to end to define the rhombic shape. The transducer 14 is secured to the arm 16 adjacent one of the vertices so that it will be sensitive to bending of the arm when forces are applied tending to elongate the rhombic shaped load cell in a vertical direction as indicated by the arrow F.

The rhombic shaped load cell 10 constitutes the sensitive load cell and is provided with suitable stop means to prevent overstressing of the same after a full scale reading has been provided. Towards this end, there are provided overlapping plates 20 and 21 extending from opposite horizontal vertices. As is clear from FIGURE 1, the plate 20 includes a pin 22 projecting upwardly through a slot 23 in the plate 21. By this arrangement, there is permitted a certain amount of play and yet the pin will engage one or the other end of the slot to prevent overstressing of the element when the force F exceeds given values in either tension or compression.

The column load cell 11 includes preferably a simple column 24 of circular cross section to which the strain gauge 15 is secured.

In some instances, the stops may be arranged along the other vertices or those that are in line with the direction of the load. Thus, referring to FIGURE 2, there is shown a rhombic shaped load cell 25 with a column load cell 26 similar to those described in conjunction with FIGURE 1. In the force measuring instrument of FIGURE 2, however, the stop means are in alignment with the securing means 27 and 28 for the load. These stop means include overlapping plates 29 and 30 including a pin 31 and slot 32 to function in a manner similarly to the stops described in FIGURE 1.

Figure 2:
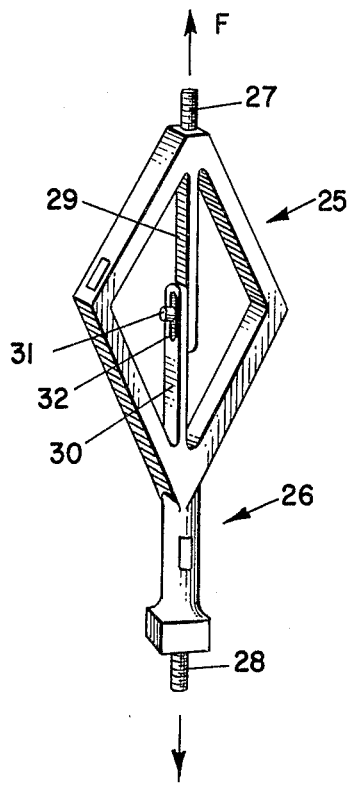
FIGURE 2 is a view similar to FIGURE 1 illustrating an alternative type of stop means; and, FIGURE 3 is a plot useful in explaining the operation of the dual range force measuring instruments of FIGURES 1 and 2.

In operation, a force such as a tension force to be measured is exerted between the securing means 12 and 13 in FIGURE 1 or 27 and 28 in FIGURE 2 in the direction of the arrow F.

Figure 3:
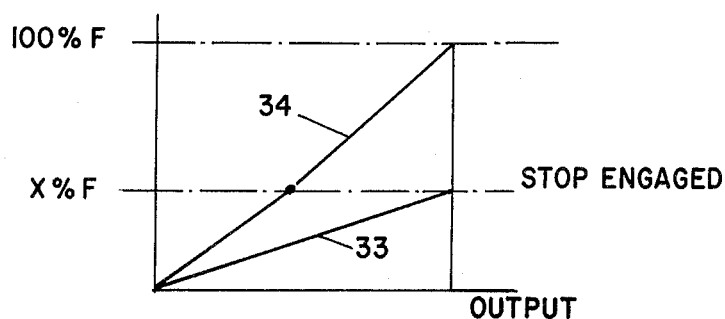

Referring to FIGURE 3, the first full scale reading will be provided by the signal output 33 from the transducer 14 for a given loading from zero up to a given fraction of full load. At this given fraction of full load corresponding to the full scale for the transducer 14, the stops comprising the overlapping plates 20 and 21, or 29 and 30, will become engaged.

The output from the column shaped load cell 24 is shown at 34 and provided by the second transducer 15. This output covers the full scale up to full load. The strain gauge on the column is responsive to strain in the column itself and is capable of measuring over a much wider range of force with correspondingly less sensitivity for a given scale range. Because the first strain gauge 14 is sensitive to bending and the second strain gauge 15 is sensitive to strain in the column 24, and because of the unique combination of rhombic and column shaped load cells, very little interaction is evident even at the point when the stops are engaged.

With particular reference to FIGURE 3, it is to be noted that the curve 34 is substantially linear even through the X percent of loading point at which the stops for the rhombic shaped load cell 10 are engaged. The substantial linearity of this overall range is a consequence of the unique combination of a rhombic and column shaped load cell.

From the foregoing description, it will thus be evident that the present invention has provided an improved dual range force measuring instrument wherein both a sensitive scale reading may be attained for given loads up to a given fraction of full load or alternatively full range loading readings may be provided over the same scale.

Minor modifications that fall clearly within the scope and spirit of this invention will occur to those skilled in the art. The dual range force measuring instrument is therefore not to be thought of as limited to the exact embodiment set forth merely for illustrative purposes.

What is claimed is:

1. A dual range force measuring instrument comprising, in combination: a rhombic shaped load cell; a column load cell having one end rigidly secured to one vertex of said rhombic shaped load cell, the opposite end of said column shaped load cell and the vertex of said rhombic shaped load cell diagonally opposite said one vertex, respectively, including means for connection to members between which forces are to be measured, the axis of said column being in alignment with a diagonal between said one vertex and said vertex diagonally opposite said one vertex; a first transducer means comprising strain gauge means secured to one arm of said rhombic shaped load cell and responsive to deformation of said cell under a load range varying up to a given fraction of the full load value for which said measuring instrument is designed for providing a first range of reading extending over a first full scale; and a second transducer means comprising a strain gauge means secured to said column shaped load cell and responsive to deformation of said cell under a load range varying up to said full load value for providing a second range of reading extending over a second full scale, said rhombic shaped load cell including stop means comprising first and second plate members extending inwardly towards each other from the vertices respectively adjacent to said one vertex and said vertex diagonally opposite said one vertex, to overlap, one of said plates having a pin extending normally therefrom and the other of said plates having a slot loosely receiving said pin so as to allow a variation in the distance between said vertices when said rhombic shaped load is deformed, said pin engaging one of the ends of said slot to prevent further deformation of said rhombic shaped load cell when said rhombic shaped load cell is subject to said fraction of said full load.

2. A dual range force measuring instrument comprising, in combination: a rhombic shaped load cell; a column load cell having one end rigidly secured to one vertex of said rhombic shaped load cell, the opposite end of said column shaped load cell and the vertex of said rhombic shaped load cell diagonally opposite said one vertex, respectively, including means for connection to members between which forces are to be measured, the axis of said column being in alignment with a diagonal between said one vertex and said vertex diagonally opposite said one vertex; a first transducer means comprising strain gauge means secured to one arm of said rhombic shaped load cell and responsive to deformation of said cell under a load range varying up to a given fraction of the full load value for which said measuring instrument is designed for providing a first range of reading extending over a first full scale; and a second transducer means comprising a strain gauge means secured to said column shaped load cell and responsive to deformation of said cell under a load range varying up to said full load value for providing a second range of reading extending over a second full scale, said rhombic shaped load cell including stop means comprising first and second plate members extending inwardly from said one vertex and said vertex diagonally opposite said one vertex, to overlap, one of said plates having a pin extending normally therefrom and the other of said plates having a slot loosely receiving said pin so as to allow a variation in the distance between said one vertex and said other vertex when said rhombic shaped load cell is deformed, said pin engaging one of the ends of said slot to prevent further deformation of said rhombic shaped load cell when said rhombic shaped load cell is subject to said fraction of said full load.

References Cited by the Examiner
UNITED STATES PATENTS

| | | | |
|---|---|---|---|
| 2,421,222 | 5/1947 | Schaevitz | 73—141 |
| 2,582,886 | 1/1952 | Ruge | 73—141 |
| 2,927,458 | 3/1960 | Moon et al. | 73—141 |
| 2,986,931 | 6/1961 | Ormond | 73—141 |
| 3,073,155 | 1/1963 | Ianuzzi | 73—141 |

RICHARD C. QUEISSER, *Primary Examiner.*

DAVID SCHONBERG, *Examiner.*